United States Patent
Olgaard et al.

(10) Patent No.: US 10,819,616 B2
(45) Date of Patent: Oct. 27, 2020

(54) SYSTEM AND METHOD FOR TESTING A DATA PACKET SIGNAL TRANSCEIVER

(71) Applicant: LitePoint Corporation, Sunnyvale, CA (US)

(72) Inventors: Christian Volf Olgaard, Saratoga, CA (US); Ruizu Wang, Santa Clara, CA (US); Kaiyun Cui, San Jose, CA (US)

(73) Assignee: LitePoint Corporation, San Jose, CA (US)

( * ) Notice: Subject to any disclaimer, the term of this patent is extended or adjusted under 35 U.S.C. 154(b) by 155 days.

(21) Appl. No.: 16/248,453

(22) Filed: Jan. 15, 2019

(65) Prior Publication Data

US 2020/0228434 A1 Jul. 16, 2020

(51) Int. Cl.
*H04L 12/26* (2006.01)
*H04B 17/318* (2015.01)

(52) U.S. Cl.
CPC .......... *H04L 43/50* (2013.01); *H04B 17/318* (2015.01)

(58) Field of Classification Search
CPC ....... H04L 43/50; H04L 1/203; H04B 17/318; H04B 17/29
See application file for complete search history.

(56) References Cited

U.S. PATENT DOCUMENTS

| 8,000,656 | B1 * | 8/2011 | Jiao | H04B 17/24 455/67.11 |
| 10,333,631 | B2 * | 6/2019 | Rowell | H01F 27/385 |
| 10,666,538 | B2 * | 5/2020 | Olgaard | H04W 24/00 |
| 10,684,318 | B1 * | 6/2020 | Kyrolainen | H04B 7/0617 |
| 10,705,152 | B1 * | 7/2020 | Weiss | G01R 31/389 |

(Continued)

FOREIGN PATENT DOCUMENTS

| KR | 10-2018-0011765 | 2/2018 | H04L 12/26 |
| WO | WO 2015-026453 | 2/2015 | G01R 31/28 |

OTHER PUBLICATIONS

International Search Report and Written Opinion issued in corresponding foreign application, PCT/US2020/012677, pp. 1-8 (dated May 8, 2020).

(Continued)

*Primary Examiner* — Parth Patel
(74) *Attorney, Agent, or Firm* — Mark A. Dalla Valle; Rosenbaum IP, P.C.

(57) ABSTRACT

System and method for testing transmission and reception performance of a data packet signal transceiver device under test (DUT). Data packet signals transmitted by a tester with a tester transmit output power (TTOP) contain trigger frames that include data corresponding to a reported tester transmit power (RTTP) of the data packet signals, and a desired received signal strength (TRSS) of DUT data packet signals to be received by the tester. Based on received signal strength of the tester data packet signals reported by the DUT (DRSS), responsive DUT data packet signals having a DUT transmit output power of RTTP−DRSS+TRSS. Successive repetitions of such tester and DUT data packet signals for multiple combinations of values of the TTOP, RTTP and DRSS enable testing transmission and reception performance of the DUT, including determining minimum and maximum DUT transmission power levels, with minimal signal interactions between tester and DUT.

12 Claims, 7 Drawing Sheets

(56) References Cited

U.S. PATENT DOCUMENTS

| | | | | |
|---|---|---|---|---|
| 10,732,222 B2* | 8/2020 | Peschke | | G01R 31/31725 |
| 2005/0134121 A1* | 6/2005 | Lathrop | | H02J 3/005 |
| | | | | 307/80 |
| 2006/0214830 A1* | 9/2006 | Vaiana | | H03K 17/04106 |
| | | | | 341/172 |
| 2008/0026748 A1* | 1/2008 | Alexander | | H04W 24/06 |
| | | | | 455/432.1 |
| 2009/0322369 A1* | 12/2009 | Song | | G01R 31/31926 |
| | | | | 324/754.06 |
| 2010/0008237 A1* | 1/2010 | Olgaard | | H04L 43/50 |
| | | | | 370/249 |
| 2010/0131214 A1* | 5/2010 | Seely | | G01R 31/30 |
| | | | | 702/58 |
| 2010/0153054 A1* | 6/2010 | Horiguchi | | G01R 31/31721 |
| | | | | 702/120 |
| 2011/0200084 A1* | 8/2011 | Griesing | | H01Q 3/267 |
| | | | | 375/224 |
| 2012/0217985 A1* | 8/2012 | Amanuma | | G01R 31/2607 |
| | | | | 324/750.01 |
| 2012/0231744 A1* | 9/2012 | Gregg | | H04B 17/29 |
| | | | | 455/67.12 |
| 2012/0231745 A1* | 9/2012 | Gregg | | H04B 17/309 |
| | | | | 455/67.12 |
| 2012/0331343 A1* | 12/2012 | Norton | | G01R 31/318371 |
| | | | | 714/25 |
| 2013/0132007 A1* | 5/2013 | Dunnihoo | | G01R 31/002 |
| | | | | 702/58 |
| 2013/0229648 A1* | 9/2013 | Chen | | G01M 11/335 |
| | | | | 356/73 |
| 2013/0303098 A1* | 11/2013 | Carlsson | | H04B 17/336 |
| | | | | 455/226.1 |
| 2014/0025330 A1* | 1/2014 | Bhandari | | G01P 21/00 |
| | | | | 702/99 |
| 2015/0058691 A1* | 2/2015 | Olgaard | | G01R 31/318371 |
| | | | | 714/734 |
| 2015/0073738 A1* | 3/2015 | Buck | | H01L 22/14 |
| | | | | 702/65 |
| 2015/0163023 A1* | 6/2015 | Aakvik | | H04L 1/203 |
| | | | | 375/224 |
| 2015/0177315 A1* | 6/2015 | Lim | | G01R 31/2834 |
| | | | | 702/108 |
| 2016/0072530 A1* | 3/2016 | El-Hassan | | H03F 3/24 |
| | | | | 455/114.2 |
| 2018/0183529 A1* | 6/2018 | Coutts | | H04B 17/0085 |
| 2018/0340967 A1* | 11/2018 | Rowell | | G01R 29/10 |
| 2019/0025403 A1* | 1/2019 | Hoffman | | H04B 17/391 |
| 2019/0068296 A1* | 2/2019 | Rowell | | G01R 29/0871 |
| 2019/0081822 A1* | 3/2019 | Simpson | | G01R 27/32 |
| 2019/0086503 A1* | 3/2019 | Simpson | | G01R 35/005 |
| 2019/0285678 A1* | 9/2019 | Abadie | | G01R 29/0878 |
| 2019/0302183 A1* | 10/2019 | Peschke | | G01R 31/11 |
| 2019/0322265 A1* | 10/2019 | Tsukamoto | | B60T 17/221 |
| 2019/0391182 A1* | 12/2019 | Dunnihoo | | G01R 31/2879 |
| 2019/0391203 A1* | 12/2019 | Sternberg | | G01R 31/31816 |
| 2020/0082238 A1* | 3/2020 | Landauer | | G06K 19/0723 |
| 2020/0112169 A1* | 4/2020 | Bao | | H02H 11/006 |
| 2020/0158768 A1* | 5/2020 | Derat | | G01R 29/105 |
| 2020/0202971 A1* | 6/2020 | Giaccio | | G11C 29/021 |
| 2020/0229206 A1* | 7/2020 | Badic | | H04W 52/0209 |

OTHER PUBLICATIONS

Lukez, J., "802.11 ax: Not just another higher data rate", EDN Network, pp. 1-5 (Mar. 31, 2017).

* cited by examiner

| DUT TX | VSA Measure |
|---|---|
| +22.0 dBm | +20.8 dBm |
| +21.0 dBm | +20.8 dBm |
| +20.0 dBm | +20.8 dBm |
| +19.0 dBm | +20.0 dBm |
| +18.0 dBm | +19.0 dBm |
| +17.0 dBm | +18.0 dBm |
| ● | ● |
| ● | ● |
| ● | ● |

SYSTEM AND METHOD FOR TESTING A DATA PACKET SIGNAL TRANSCEIVER

BACKGROUND

The present invention relates to testing a data packet signal transceiver device under test (DUT), and in particular, testing transmission and/or reception performance of a DUT with minimal required signal interactions between a tester and the DUT.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

Testing of such wireless devices typically involves testing of the receiving and transmitting subsystems of the device under test (DUT). The testing system will send a prescribed sequence of test data packet signals to a DUT, e.g., using different frequencies, power levels, and/or signal modulation techniques to determine if the DUT receiving subsystem is operating properly. Similarly, the DUT will send test data packet signals at a variety of frequencies, power levels, and/or modulation techniques for reception and processing by the testing system to determine if the DUT transmitting subsystem is operating properly.

For testing these devices following their manufacture and assembly, current wireless device test systems typically employ testing systems having various subsystems for providing test signals to each device under test (DUT) and analyzing signals received from each DUT. Some systems (often referred to as "testers") include, at least, one or more sources of test signals (e.g., in the form of a vector signal generator, or "VSG") for providing the source signals to be transmitted to the DUT, and one or more receivers (e.g., in the form of a vector signal analyzer, or "VSA") for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

A recent wireless local area network (WLAN) standard in the IEEE 802.11 set of specifications, known as IEEE 802.11ax, operates in existing 2.4 GHz and 5 GHz spectrums and will incorporate additional bands between 1 and 7 GHz as they become available. In addition to using MIMO and MU-MIMO, OFDMA has been introduced to improve overall spectral efficiency, and higher order 1024-QAM modulation support for increased throughput. Though the nominal data rate is just 37% higher than IEEE 802.11ac, it is expected to achieve a 4× increase to average user throughput due to more efficient spectrum utilization and improvements for dense deployments. However, requirements for 802.11ax power accuracies of transmit (TX) power and received signal strength indicator (RSSI) readings of a device are significantly more restrictive to ensure its compatibility with and operations within a WLAN.

Accordingly, TX power and RSSI must be calibrated and tested as part of the manufacturing process. While TX power testing may generally be simple and optimized for efficiency with technologies like MPS (multi packet testing), RSSI testing typically requires querying the DUT for its measured or reported RSSI value. However, querying the DUT is inefficient due to the additional test time needed to accommodate exchanges of query and reply packets.

Additionally, development software for manufacturing testing is significantly complicated by the fact that DUT calibration is often implemented differently among the chipset manufacturers as well as from chipset to chipset by a manufacturer. For example, as noted, calibration of receive (RX) signal operations is often particularly time consuming due to the need for querying the DUT for its receiver operation status and/or performance.

SUMMARY

A system and method are provided for testing transmission and reception performance of a data packet signal transceiver device under test (DUT). Data packet signals transmitted by a tester with a tester transmit output power (TTOP) contain trigger frames that include data corresponding to a reported tester transmit power (RTTP) of the data packet signals, and a desired received signal strength (TRSS) of DUT data packet signals to be received by the tester. Based on received signal strength of the tester data packet signals reported by the DUT (DRSS), responsive DUT data packet signals having a DUT transmit output power of RTTP−DRSS+TRSS. Successive repetitions of such tester and DUT data packet signals for multiple combinations of values of the TTOP, RTTP and DRSS enable testing transmission and reception performance of the DUT, including determining minimum and maximum DUT transmission power levels, with minimal signal interactions between tester and DUT.

In accordance with exemplary embodiments, a method of testing transmission and reception performance of a data packet signal transceiver device under test (DUT) includes: transmitting, with a tester for a DUT, a tester data packet signal including a trigger frame and having a tester transmit output power (TTOP), wherein the trigger frame includes data corresponding to a reported tester transmit power (RTTP) of the tester data packet signal, wherein the RTTP and TTOP are unequal, and a desired received signal strength (TRSS) of a DUT data packet signal to be received by the tester from the DUT; receiving, with the tester from the DUT, a DUT data packet signal having a DUT transmit output power of RTTP−DRSS+TRSS, wherein DRSS is a received signal strength of the tester data packet signal reported by the DUT; and repeating the transmitting and the receiving for a plurality of combinations of values of the TTOP, the RTTP and the DRSS.

In accordance with further exemplary embodiments, a method of testing transmission and reception performance of a data packet signal transceiver device under test (DUT) includes: receiving, with a DUT, a tester data packet signal including a trigger frame and having a tester transmit output power (TTOP), wherein the trigger frame includes data corresponding to a reported tester transmit power (RTTP) of the tester data packet signal, wherein the RTTP and TTOP are unequal, and a desired received signal strength (TRSS) of a DUT data packet signal to be received by a tester from the DUT; transmitting, with the DUT for the tester, a DUT data packet signal having a DUT transmit output power of RTTP−DRSS+TRSS, wherein DRSS is a received signal strength of the tester data packet signal reported by the DUT; and repeating the receiving and the transmitting for a plurality of combinations of values of the TTOP, the RTTP and the DRSS.

In accordance with further exemplary embodiments, a method of testing transmission and reception performance of a data packet signal transceiver device under test (DUT) includes: transmitting, with a tester, a tester data packet signal including a trigger frame and having a tester transmit output power (TTOP), wherein the trigger frame includes data corresponding to a reported tester transmit power (RTTP) of the tester data packet signal, wherein the RTTP and TTOP are unequal, and a desired received signal strength (TRSS) of a DUT data packet signal to be received by the tester from a DUT; receiving, with the DUT, the tester data packet signal and in response thereto reporting a received signal strength (DRSS) of the tester data packet signal received by the DUT; transmitting, with the DUT, a DUT data packet signal having a DUT transmit output power of RTTP−DRSS+TRSS; receiving, with the tester, the DUT data packet signal; and repeating the transmitting with the tester, the receiving with the DUT, the transmitting with the DUT, and the receiving with the tester for a plurality of combinations of values of the TTOP, the RTTP and the DRSS.

BRIEF DESCRIPTION OF THE DRAWINGS

FIG. 9 depicts a table of intended power levels and actual power levels for the data packets of FIG. 8.

DETAILED DESCRIPTION

Figure 1:
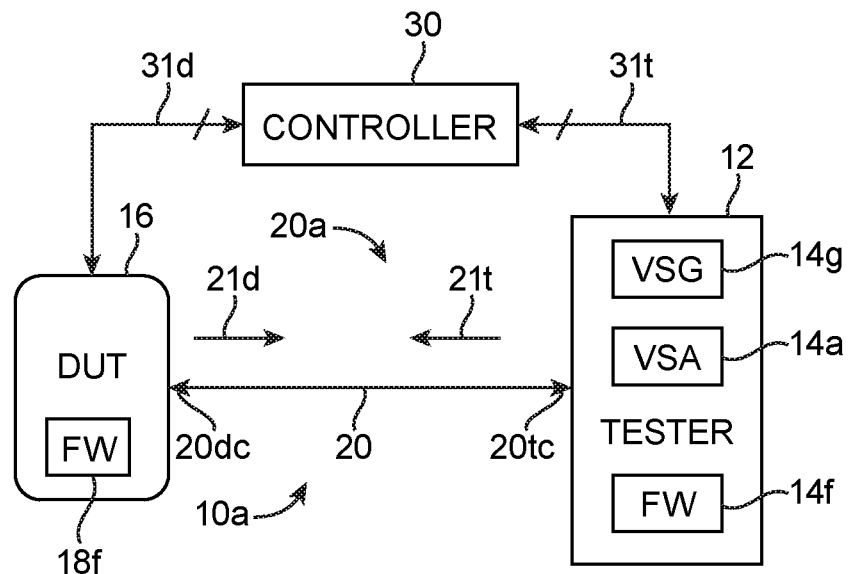
FIG. 1 depicts a wired, or conductive, test environment for testing a data packet signal transceiver device in accordance with exemplary embodiments.

The following detailed description is of example embodiments of the presently claimed invention with references to the accompanying drawings. Such description is intended to be illustrative and not limiting with respect to the scope of the present invention. Such embodiments are described in enough detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies, such as IEEE 802.11a/b/g/n/ac ("WiFi"), 3GPP LTE, Bluetooth, Zigbee, Z-Wave, etc. The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and one or more transmitters. Thus, the tests are intended to confirm whether the receivers and transmitters both conform. Tests of the receiver(s) of the DUT (RX tests) typically involve a test system (tester) sending test packets to the receiver(s) and some way of determining how the DUT receiver(s) respond to those test packets. Tests of the transmitter(s) of the DUT (TX tests) are performed by having them send packets to the test system, which may then evaluate various physical characteristics of the signals from the DUT.

Testing of wireless devices, such as Wi-Fi, Bluetooth, Zigbee and Z-Wave devices, has progressed from frequent two-way messaging between a tester and DUT to infrequent messaging between which major portions of test flows are executed within and coordinated between tester and DUT using non-link test solutions where only the unique device identifier and portions of the PHY are active. However, results of such tests would typically have been conveyed from DUT to tester via communications ports and pathways as the upper level of the protocol stack is not active, thereby preventing data from being easily conveyed in the transmitted packets. Therefore, where the only connection between a DUT and tester is either conducted or radiated signal paths and the data exchanged is via data packets, it may be difficult, if possible at all, for a DUT to convey test results to a tester using non-link test methods. As discussed in more detail below, in accordance with exemplary embodiments of the presently claimed invention, testing of a RF data packet transceiver can be performed, at least in part, by testing at lower layers of the network data packet signal communications protocol.

Referring to FIG. 1, a typical testing environment 10a includes a tester 12 and a DUT 16, with test data packet signals 21t and DUT data packet signals 21d exchanged as RF signals conveyed between the tester 12 and DUT 16 via a conductive signal path 20a, typically in the form of co-axial RF cable 20c and RF signal connectors 20tc, 20dc. As noted above, the tester typically includes a signal source 14g (e.g., a VSG) and a signal analyzer 14a (e.g., a VSA). The tester 12 and DUT 16 may also include preloaded information regarding predetermined test sequences, typically embodied in firmware 14f within the tester 12 and firmware 18f within the DUT 16. The testing details within this firmware 14f, 18f about the predetermined test flows typically require some form of explicit synchronization between the tester 12 and DUT 16, typically via the data packet signals 21t, 21d.

Alternatively, testing may be controlled by a controller 30 which may be integral to the tester 12 or external (e.g., a local or networked programmed personal computer) as depicted here. The controller 30 may communicate with the DUT 16 via one or more signal paths (e.g., Ethernet cabling, network switches and/or routers, etc.) 31d to convey commands and data. If external to the tester 12, the controller 30 may further communicate with the tester 12 via one or more additional signal paths (e.g., Ethernet cabling, network switches and/or routers, etc.) 31t to convey additional commands and data.

While the controller 30 and tester 12 are depicted as separate devices or systems, references to a "tester" in the following discussion may include separate devices or systems as depicted here and may also include a combined device or system in which the functions and capabilities of the controller 30 and tester 12 described above may be co-located in a common hardware infrastructure. Accordingly, unless otherwise specifically required or limited, references made to various control functions and/or commands may be considered to originate in a tester 12, a controller 30 or a combined tester/controller system (not shown). Similarly, storage of commands, data, etc., may be considered to be done in a tester 12, a controller 30 or a combined tester/controller system, or alternatively in memory devices located remotely via a network as noted above.

Figure 2:
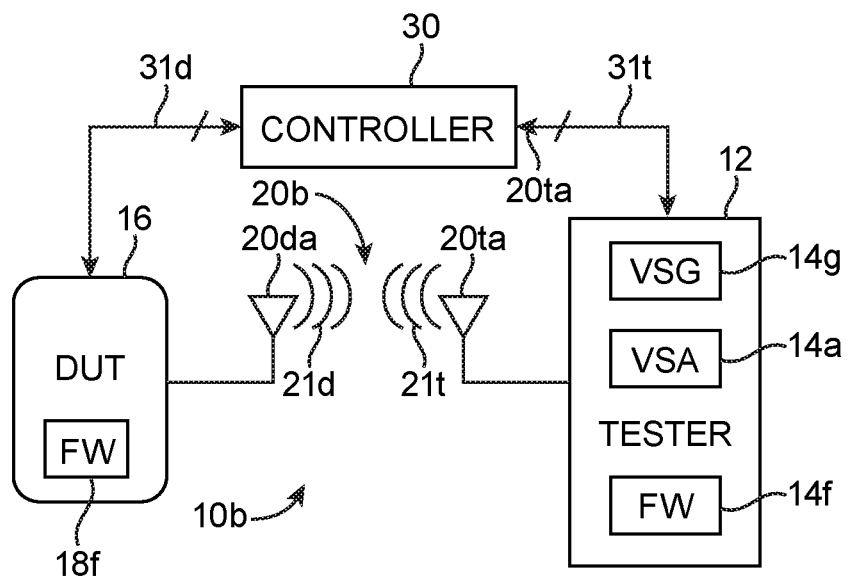
FIG. 2 depicts a wireless, or radiative, test environment for testing a data packet signal transceiver device in accordance with exemplary embodiments.

Referring to FIG. 2, an alternative testing environment 10b uses a wireless signal path 20b via which the test data packet signals 21t and DUT data packet signals 21d may be communicated via respective antenna systems 20ta, 20da of the tester 12 and DUT 16.

As discussed in more detail below, a trigger based test (TBT) may be advantageously used in which a tester sends a data packet containing a trigger frame to the DUT, thereby causing the DUT to timely reply with a frequency corrected signal. As is well known in the art, in conformance with the IEEE 802.11 set of specifications, a trigger frame may be provided by an access point (AP, e.g., a tester in a test environment) for a STA device (e.g., a DUT in the test environment) and include various types of information about the transmitted signal from the tester emulating an AP access point. For example, the actual signal power transmitted by the tester (e.g., via its VSG) may be controlled separately from the reported tester power level information contained in the trigger frame, and thereby emulate a path loss does not exist. Also, desired RSSI information may be contained in the trigger frame identifying the strength of the data packet signal to be sent in reply by the DUT. The DUT may calculate a path loss as the difference in power between the reported transmitted power by the tester and the DUT received signal strength, and then calculate a transmit power as the desired RSSI (at the tester) plus the calculated path loss.

However, the transmit power as measured by the tester is affected by two errors: a difference between the intended and actual transmit powers, and RSSI measurement error. As discussed in more detail below, this may be compensated by "forcing" transmissions of multiple TX powers supported by the DUT prior to the TBT test. By using MPS, the intended TX power may be known a priori for each DUT TX power chosen for transmission and associated with a corresponding actual received TX power as measured at the tester. This may then be followed by traditional TBT testing, and from the measured transmit power the intended power level chosen by the DUT may be determined, thereby enabling a calculation of the RSSI (at the DUT) the DUT must have used to select the chosen intended transmit power. This enables a determination (e.g., inferential) of the DUT RSSI without querying the DUT. This may be further extended by repeating the TBT step for different RSSI levels in the DUT and then sweeping the RSSI level during verification.

For example, the TX power of a DUT may be scanned and measured for a known number of transmit power levels (e.g., using MPS), followed by a TBT test for the different RSSI levels to be tested, during which the target power level may remain fixed or it may be varied. Maintaining a fixed target power (power of DUT TX signal as received by tester) enables reuse of a test data packet (e.g., by varying the VSG output power level, thereby effectively modelling a different path loss as seen by the DUT), though it may limit the power range within the DUT when sweeping a large RSSI range. As noted, once the TX power level selected by the DUT has been identified, the corresponding RSSI within the DUT may be calculated. Alternatively, a constant VSG output power may be maintained while transmitting different trigger frames packets (e.g., with modified reported VSG output powers and target tester RSSI levels).

Figures 3, 4:
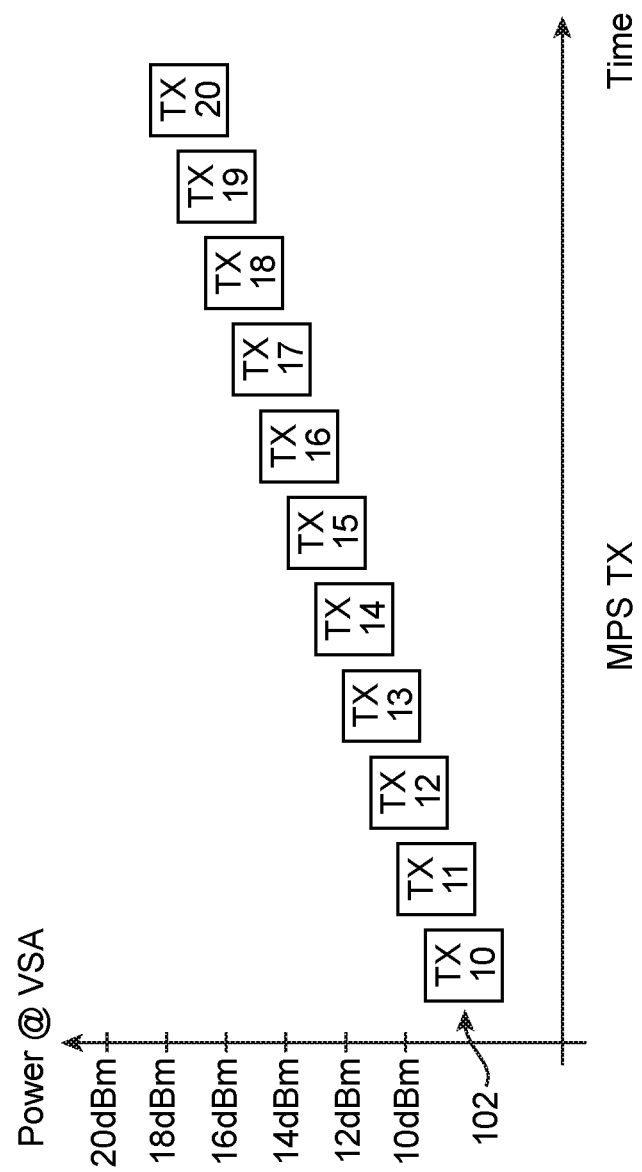
FIG. 3 depicts transmission by a DUT of multiple data packets having predetermined intended power levels for testing a data packet signal transceiver device in accordance with exemplary embodiments.
FIG. 4 depicts a table of predetermined intended power levels and corresponding received power levels for the data packets of FIG. 3.

Referring to FIGS. 3 and 4, a sequence 102 of multiple data packet signals (e.g., each having single or multiple data packets as desired or needed) having predetermined intended power levels 102i may be transmitted by the DUT and received by the tester to determine the corresponding actual power levels 102r for each transmission. For example, MPS may first be used to determine the DUT TX power as measured by the tester (e.g., at the VSA) for a given TX power setting within the DUT. This may be advantageous to validate the DUT TX power accuracy. The DUT may, as desired or needed, transmit a single data packet or multiple data packets (the number of which will typically be known a priori), e.g., beginning with a first power TX10

(10 dbm), followed by one or more similar data packet transmissions, e.g., TX11, TX12, ..., TX20. (For purposed of this example, TX10, TX11, TX12, ..., TX20 indicate intended power levels 102$i$ of +10 dBm, +11 dBm, +12 dBm, ..., +20 dBm, respectively, though other power ranges may be used as desired or needed.)

The tester (e.g., the VSA) measures the received power 102$r$ of each transmitted signal and creates a table of the respective corresponding intended 102$i$ and received 102$r$ (e.g., as measured by the VSA) power levels as shown. For example, while the DUT TX signal was intended (e.g., by design of the DUT transmitter circuitry) to be 15 dBm, the VSA may measure the actual received power as 14.5 dBm. These corresponding values may be stored in memory (e.g., locally within the tester or remotely within memory accessible via a network) for later use (as discussed below). The DUT may then be programmed for operating in a TBT mode.

Figure 5:
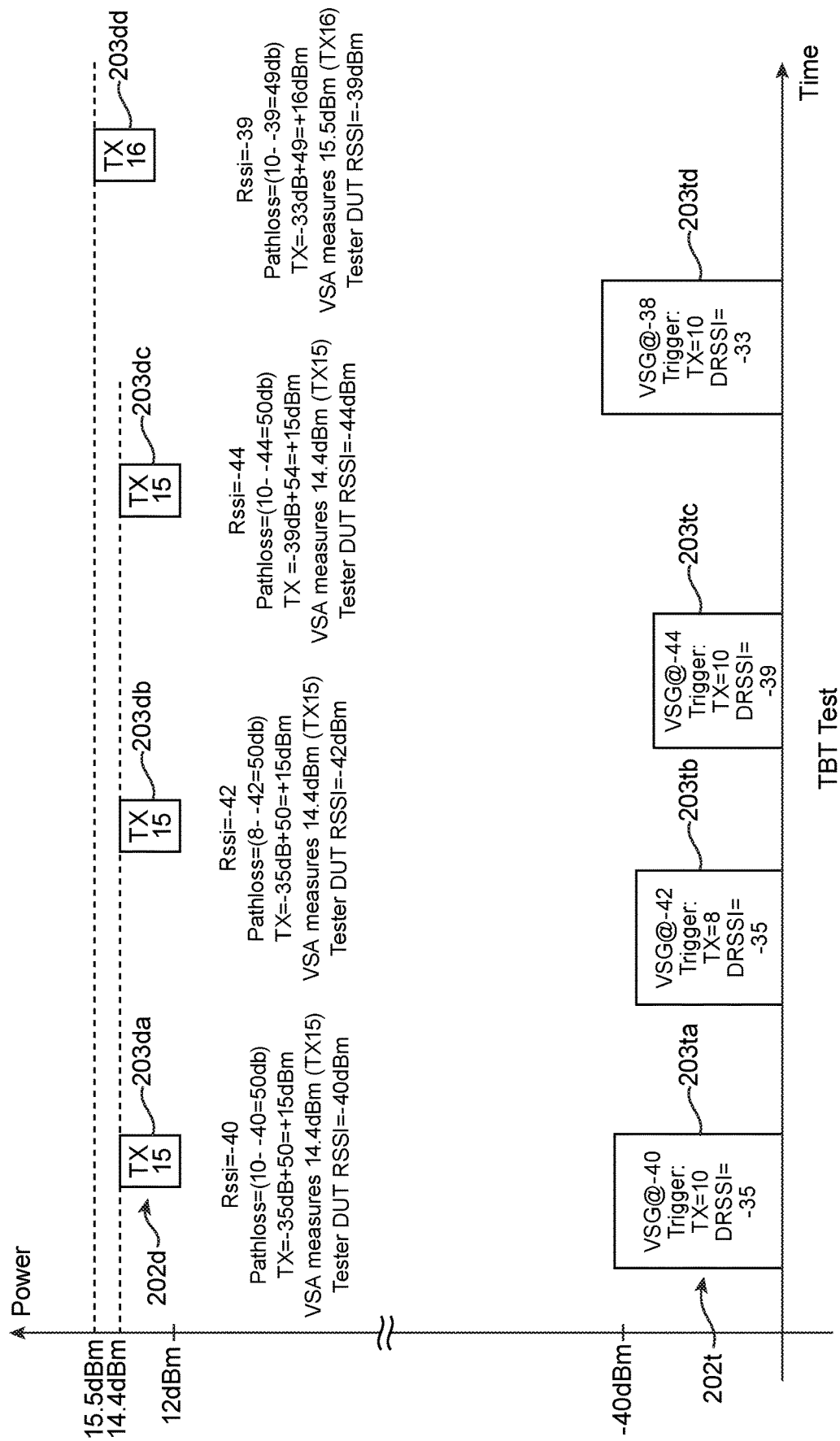
FIG. 5 depicts an example sequence of data packet signal exchanges between a tester and DUT for testing a data packet signal transceiver device in accordance with exemplary embodiments.

Referring to FIG. 5, examples of tester data packet signal sequences 202$t$ and DUT data packet signal sequences 202$d$ may be exchanged as shown. These examples demonstrate how different settings may be used to indirectly control DUT TX power to be a constant 15 dBm. Other levels and combination of levels may be used as desired or needed. In any event, it may be desirable to keep one parameter constant to enable detection of other factors (e.g., thermal changes etc.) affecting performance characteristics.

In a first tester sequence 203$ta$ the tester may transmit a data packet signal at a tester transmit output power TTOP of −40 dBm with a trigger frame containing data identifying a reported tester transmit power RTTP of +10 dBm, and data identifying a desired, or expected, received signal strength TRSS of −35 dBm for the DUT data packet signal to be received by the tester. In the first DUT sequence 203$da$ the DUT determines its received signal strength DRSS to be −40 dBm and calculates a perceived path loss PPL as follows:

PPL=RTTP−DRSS=+10 dBm−(−40 dBm)=50 dB

Hence, with a 50 dB path loss and a desired RSSI at the tester (after accounting for path loss) of −35 dBm the DUT must transmit an intended DUT transmit power IDTP as follows:

IDTP=TRSS+PPL=−35 dBm+50 dB=+15 dBm

The tester captures the response data packet signal from the DUT with a received power of +14.4 dBm and compares this with its corresponding IDTP of +15 dBm (FIG. 4). Accordingly, as this was what was expected, the RSSI determined by the DUT is considered as accurate.

In the next tester sequence 203$tb$, the tester may transmit a data packet signal at a tester transmit output power TTOP of −42 dBm with a trigger frame containing data identifying a reported tester transmit power RTTP of +8 dBm (e.g., versus the previous TTOP of +10 dBm), and data identifying the same desired, or expected, received signal strength TRSS of −35 dBm for the DUT data packet signal to be received by the tester. In the responsive DUT sequence 203$db$ the DUT determines its received signal strength DRSS to be −42 dBm and calculates a perceived path loss PPL as follows:

PPL=RTTP−DRSS=+8 dBm−(−42 dBm)=50 dB

Hence, with a 50 dB path loss and a desired RSSI at the tester (after accounting for path loss) of −35 dBm the DUT must again transmit an intended DUT transmit power IDTP of +15 dBm. Accordingly, the tester captures the response data packet signal from the DUT with a received power of +14.4 dBm and compares this with its corresponding IDTP of +15 dBm (FIG. 4). Again, as this was what was expected, the RSSI determined by the DUT is considered as accurate.

In the third tester sequence 203$tc$, the tester may transmit a data packet signal at a tester transmit output power TTOP of −44 dBm with a trigger frame containing data identifying a reported tester transmit power RTTP of +10 dBm (e.g., as in the first sequence 203$ta$), and data identifying the same desired, or expected, received signal strength TRSS of −39 dBm for the DUT data packet signal to be received by the tester. In the responsive DUT sequence 203$dc$ the DUT determines its received signal strength DRSS to be −44 dBm and calculates a perceived path loss PPL as follows:

PPL=RTTP−DRSS=+10 dBm−(−44 dBm)=54 dB

Hence, with a 54 dB path loss and a desired RSSI at the tester (after accounting for path loss) of −39 dBm the DUT must again transmit an intended DUT transmit power IDTP of +15 dBm. Accordingly, the tester captures the response data packet signal from the DUT with a received power of +14.4 dBm and compares this with its corresponding IDTP of +15 dBm (FIG. 4). Again, as this was what was expected, the RSSI determined by the DUT is considered as accurate.

In the last tester sequence 203$td$, an erroneous DUT received signal strength DRSS may be detected. For example, the tester may transmit a data packet signal at a tester transmit output power TTOP of −38 dBm with a trigger frame containing data identifying a reported tester transmit power RTTP of +10 dBm, and data identifying the same desired, or expected, received signal strength TRSS of −33 dBm for the DUT data packet signal to be received by the tester. In the responsive DUT sequence 203$dc$ the DUT determines its received signal strength DRSS to be −39 dBm (versus the −38 dBm that was transmitted) and calculates a perceived path loss PPL as follows:

PPL=RTTP−DRSS=+10 dBm−(−39 dBm)=49 dB

Hence, with a 49 dB path loss and a desired RSSI at the tester (after accounting for path loss) of −33 dBm the DUT must transmit an intended DUT transmit power IDTP as follows:

IDTP=TRSS+PPL=−33 dBm+49 dB=+16 dBm

The tester captures the response data packet signal from the DUT with a received power of +15.5 dBm and compares this with its corresponding IDTP of +16 dBm (FIG. 4). Accordingly, as this was not what was expected, the RSSI determined by the DUT is considered as erroneous.

As will be readily understood by one skilled in the art, many variations of this process may be practiced, e.g., for various combinations of values of TTOP, RTTP and TRSS. For example, while the DUT TX power need not necessarily remain constant, keeping it constant may advantageously enable tracking of first order effects such as temperature and temperature compensation mechanisms (e.g., the DUT may be designed to increase its TX power if it is detected as having decreased due to increased temperature).

Figure 6:
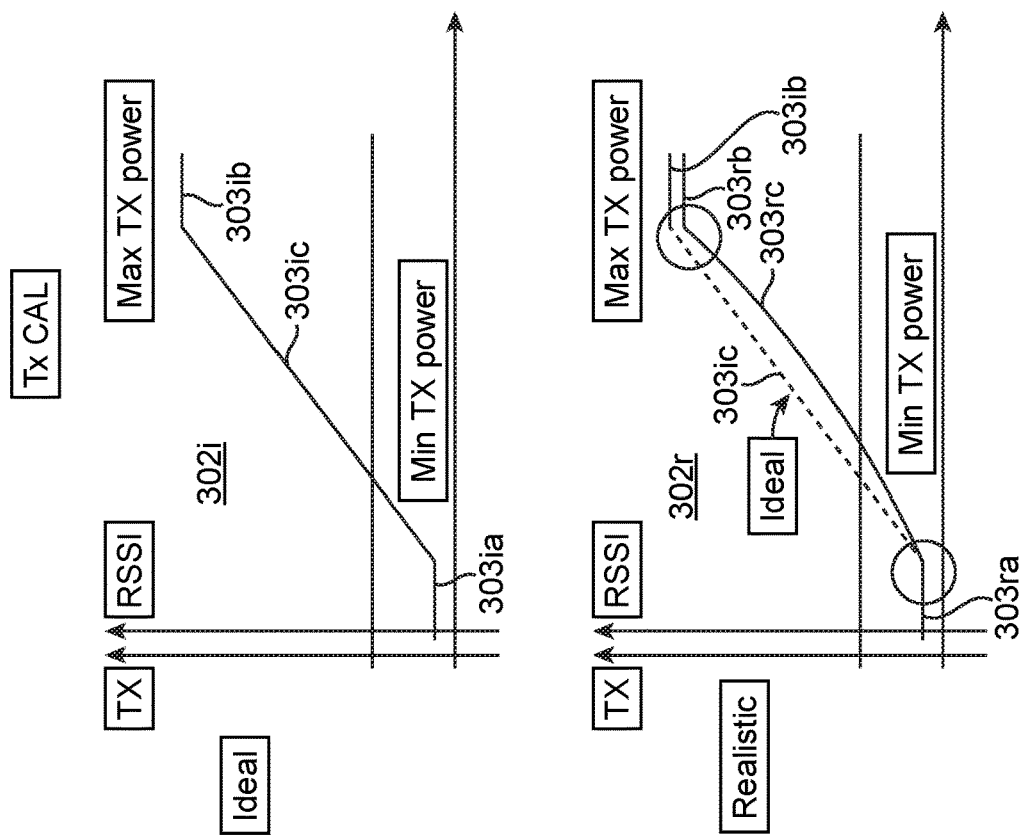
FIG. 6 depicts comparative graphs of ideal and realistic available transmit power levels, minimum through maximum, from a DUT.

Referring to FIG. 6, while a DUT may be designed to provide certain transmit signal performance characteristics 302$i$, its actual performance characteristics 302$r$ often vary. For example, while a DUT may be designed to ideally provide transmit power levels over a linear range 303$ic$, from a minimum power 303$ia$ through a maximum power 303$ib$, its realistic transmit power levels may be provided instead over a non-linear range 303$ir$, with a different minimum power 303$ir$ and maximum power 303$ir$.

Figure 6A:
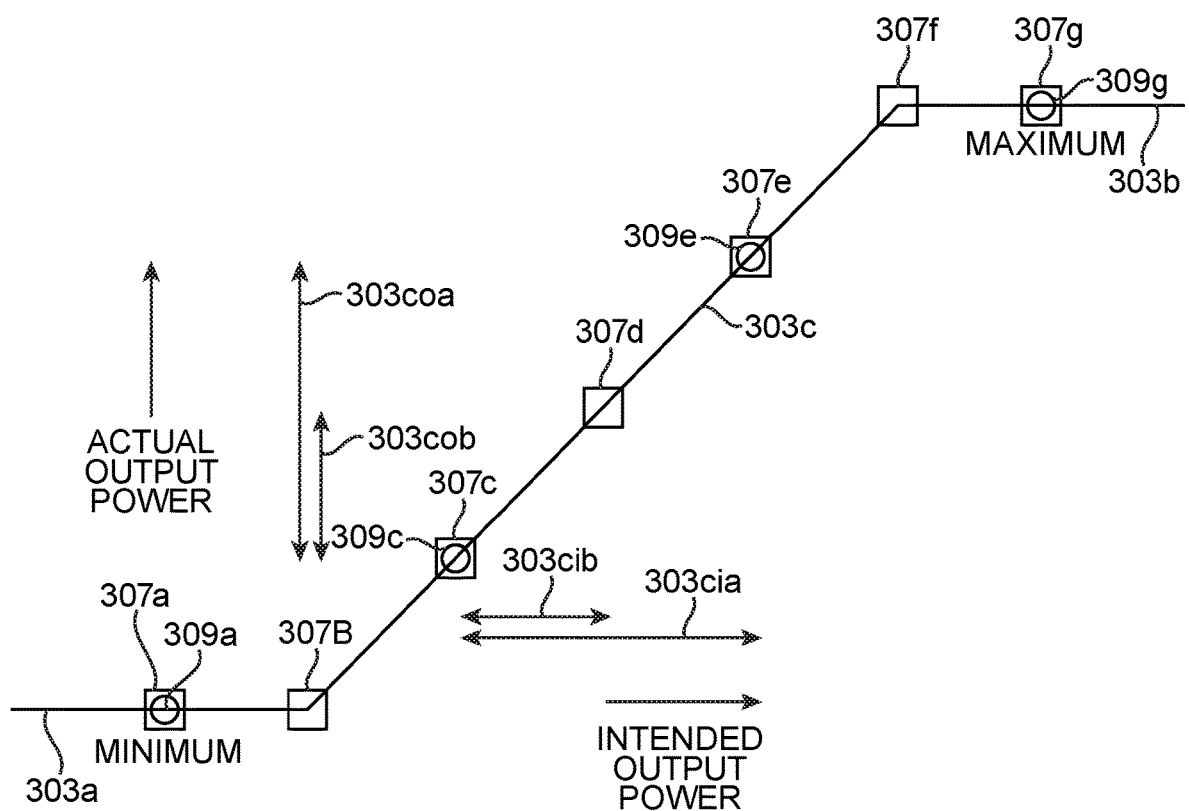
FIG. 6A depicts, qualitatively, multiple values of actual DUT output powers produced in response to corresponding intended, or programmed, DUT output powers in accordance with two example step size resolutions.

Referring to FIG. 6A, as will be readily appreciated, depending upon the specific power levels 307, 309 specified by the tester for production by the DUT, it may be desirable for a larger number of power levels to be specified and measured during testing. Hence, to ensure that the minimum 303a and maximum 303b actual power levels are accurately determined, e.g., at the power levels 307b, 307f where power become constant as it transitions from a variable power 303c to the minimum 303a or maximum 303b power, it may be desirable to specify a larger number of power steps. For example, it may be preferable to use smaller input power step intervals 303cib that result in corresponding output power step intervals 303cob (as indicated with "squares") that not only identify the power levels 307b, 307f at which the minimum 303a and maximum 303b output power levels initially occur but also identify the power levels 307a, 307g beyond at which the minimum 303a and maximum 303b output power levels remain constant. In contrast thereto, if larger input power step intervals 303cia are used, the correspondingly larger output power step intervals 303coa (as indicated with "circles") may result in failures to capture the transition power levels 307b, 307f at which the minimum 303a and maximum 303b output power levels initially occur.

Figure 7:
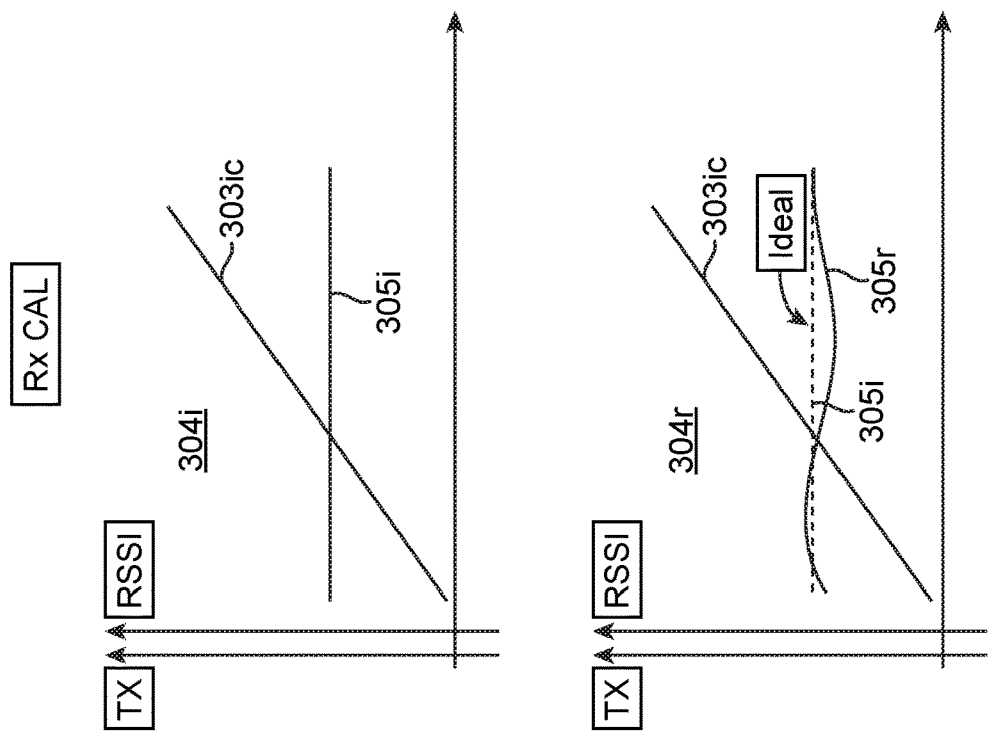
FIG. 7 depicts comparative graphs of ideal and realistic linearity of received signal strength indication (RSSI) measurements by a DUT.

Referring to FIG. 7, similarly, while a DUT may be designed to provide certain receive signal performance characteristics, its actual performance characteristics will often vary. For example, while a DUT may be designed to ideally determine received signal strengths 305i linearly over the range of expected received signals 303ic, its realistic measured received signal strengths 305r may exhibit non-linear variances.

In accordance with further exemplary embodiments, a trigger based test (TBT) may be used to enable information presented to a DUT to control its behavior and allow extraction of parameters needed to perform a calibration (e.g., a form of trim calibration, since an initial default calibration will have generally been performed during design and earlier manufacturing processes). As part of the TBT the packet sent to the DUT may include information about the data packet transmit power (e.g., from the tester), and the desired RSSI (at the tester). The DUT may use this to determine the path loss between the source of the data packet (the tester) and the DUT (path loss=transmitted power of data packet−RSSI at DUT), with which the DUT may select the appropriate DUT TX power to get the desired RSSI at the data packet source (DUT TX power=tester RSSI+path loss). Using a tester as the source enables significant control. For example, simply controlling the input power to the DUT with a given data packet enables control of the DUT TX power. For example, if the same data packet is sent to a DUT at two different tester transmit power levels, the DUT should estimate two different path losses consistent with the difference between the two tester transmit power levels, and since the data packet is identical, the resulting DUT TX power levels should ideally be the difference between the two sent data packets. Similarly, the actual tester transmit power may be maintained constant while changing the desired RSSI at the tester and/or the reported tester transmit power and thereby cause the DUT to transmit at a different TX power.

With these techniques the linearity of DUT transmit power may be measured by keeping RSSI constant to the DUT (e.g., by using a constant transmit power from the tester) and control the data packet contents to cause the DUT to transmit at different power levels, thereby effectively sweeping the power control range. Assuming the supported power range is known (e.g., the DUT limits its minimum and maximum power levels), the level may be determined where the DUT ceases to correct its transmit power, thereby revealing its internal TX value and essentially make the swept curve absolute. Then, with the RSSI level used known as well, and the TX power step used is known, the RSSI measured by the DUT may be determined. This then further enables sweeping the RSSI input levels to the DUT, ideally keeping the DUT TX power constant by controlling the data packet contents to force the DUT to transmit the same power level for a given RSSI provided into the DUT. Additionally, the RSSI may be stepped in increments finer than the capabilities of the DUT RSSI level reporting to determine where the switch over point is. Performing a full RSSI sweep will enable correction of the actual RSSI curve based on offsets from the expected ("ideal") RSSI curve.

Figure 8:
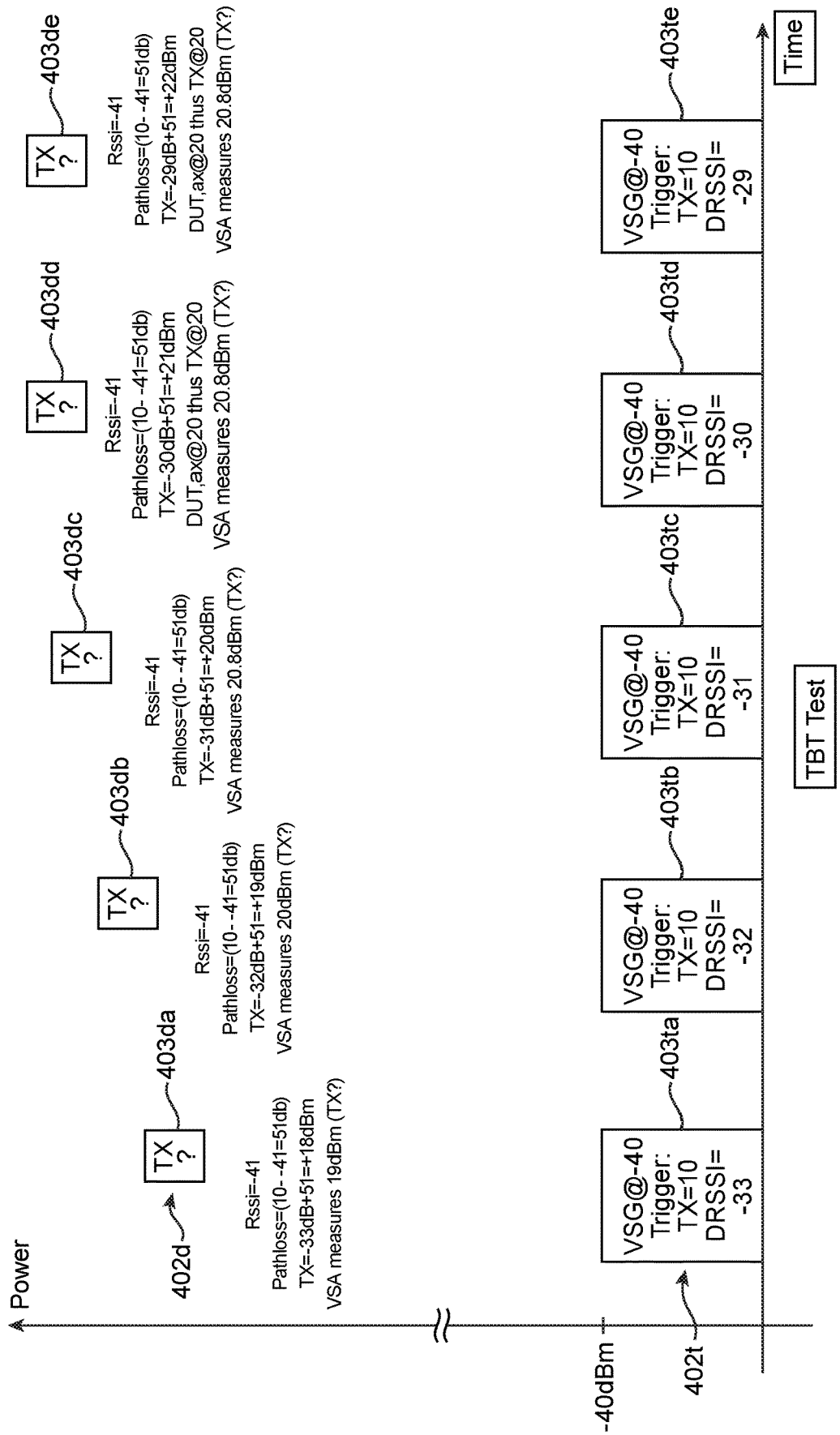
FIG. 8 depicts another example sequence of data packet signal exchanges between a tester and DUT for testing a data packet signal transceiver device in accordance with exemplary embodiments.

Referring to FIGS. 8 and 9, other examples of tester data packet signal sequences 402t and DUT data packet signal sequences 402d (e.g., with each signal 402t, 402d having single or multiple data packets as desired or needed) may be exchanged, with predetermined intended power levels 402di transmitted by the DUT and received by the tester to determine the corresponding actual power levels 402dr for each transmission. For example, once a table of corresponding intended and actual DUT TX power levels (e.g., similar to FIG. 4) is determined, a similar determination of corresponding RSSI values may be made. (This example picks up near the end of a power sweep so similar measurements may be performed prior to reaching this point in the test).

In a first tester sequence 403ta, with a target DUT TX power of +17 dBm, the tester may transmit a data packet signal at a tester transmit output power TTOP of −40 dBm with a trigger frame containing data identifying a reported tester transmit power RTTP of +10 dBm, and data identifying a desired, or expected, received signal strength TRSS of −33 dBm for the DUT data packet signal to be received by the tester. In the first DUT sequence 403da the DUT erroneously determines its received signal strength DRSS to be −41 dBm and calculates a perceived path loss PPL as follows:

$$PPL=RTTP-DRSS=+10 \text{ dBm}-(-41 \text{ dBm})=51 \text{ dB}$$

Hence, with an erroneous 51 dB path loss and a desired RSSI at the tester (after accounting for path loss) of −33 dBm the DUT must transmit an intended DUT transmit power IDTP as follows:

$$IDTP=TRSS+PPL=-33 \text{ dBm}+51 \text{ dB}=+18 \text{ dBm}$$

The tester (e.g., the VSA) captures the response data packet signal from the DUT with a received power of +19.0 dBm but it cannot be determined if the DUT TX power is off by 2 dB, or if the RSSI is off by 2 dB, or if both are off by some other combination (e.g., each is off by 1 dB).

In the next tester sequence 403tb, with a target DUT TX power of +18 dBm, the tester maintains a constant tester transmit output power TTOP of −40 dBm with a trigger frame containing data identifying a constant reported tester transmit power RTTP of +10 dBm, and data identifying an increased desired, or expected, received signal strength TRSS of −32 dBm for the DUT data packet signal to be received by the tester. In the responsive DUT sequence 403db the DUT again erroneously determines its received signal strength DRSS to be −41 dBm and again erroneously calculates a perceived path loss PPL of 51 dB. Accordingly, the DUT determines it must transmit an intended DUT transmit power IDTP as follows:

$$IDTP=TRSS+PPL=-32 \text{ dBm}+51 \text{ dB}=+19 \text{ dBm}$$

The tester captures the response data packet signal from the DUT with a received power of +20.0 dBm but, again, the source(s) of the error is (are) unknown.

In the third tester sequence 403tc, with a target DUT TX power of +18 dBm, the tester maintains a constant tester transmit output power TTOP of −40 dBm with a trigger frame containing data identifying a constant reported tester transmit power RTTP of +10 dBm, and data identifying a further increased desired, or expected, received signal strength TRSS of −31 dBm for the DUT data packet signal to be received by the tester. In the responsive DUT sequence 403dc the DUT again erroneously determines its received signal strength DRSS to be −41 dBm and again erroneously calculates a perceived path loss PPL of 51 dB. Accordingly, the DUT determines it must transmit an intended DUT transmit power IDTP as follows:

IDTP=TRSS+PPL=−31 dBm+51 dB=+20 dBm

The tester captures the response data packet signal from the DUT with a received power of +20.8 dBm.

In the next tester sequence 403td, the tester maintains a constant tester transmit output power TTOP of −40 dBm with a trigger frame containing data identifying a constant reported tester transmit power RTTP of +10 dBm, and data identifying a further increased desired, or expected, received signal strength TRSS of −30 dBm for the DUT data packet signal to be received by the tester. In the responsive DUT sequence 403dd the DUT again erroneously determines its received signal strength DRSS to be −41 dBm and again erroneously calculates a perceived path loss PPL of 51 dB. Accordingly, the DUT determines it must transmit an intended DUT transmit power IDTP as follows:

IDTP=TRSS+PPL=−30 dBm+51 dB=+21 dBm

The tester again captures the response data packet signal from the DUT with a received power of +20.8 dBm.

In the last tester sequence 403te, with an increased target DUT TX power of +20 dBm, the tester maintains a constant tester transmit output power TTOP of −40 dBm with a trigger frame containing data identifying a constant reported tester transmit power RTTP of +10 dBm, and data identifying a further increased desired received signal strength TRSS of −29 dBm for the DUT data packet signal to be received by the tester. In the responsive DUT sequence 403de the DUT again erroneously determines its received signal strength DRSS to be −41 dBm and again erroneously calculates a perceived path loss PPL of 51 dB. Accordingly, the DUT determines it must transmit an intended DUT transmit power IDTP as follows:

IDTP=TRSS+PPL=−29 dBm+51 dB=+22 dBm

The tester again captures the response data packet signal from the DUT with a received power of +20.8 dBm.

However, as it is known that the DUT TX power is limited to a maximum of +20 dBm, it may be concluded that, with the TRSS of −31 dBm resulting in +20 dBm being transmitted by the DUT, the DRSS is off by 1 dB, since the DUT is transmitting +20 dBm and must be doing so as a result of the DUT erroneously calculating a path loss of 51 dB to decide on the +20 dBm DUT TX power. Accordingly, a table (FIG. 9) of corresponding intended 402di and received 402dr DUT TX powers may be derived.

Various other modifications and alternatives in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of testing transmission and reception performance of a data packet signal transceiver device under test (DUT), comprising:
    transmitting, with a tester for a DUT, a tester data packet signal including a trigger frame and having a tester transmit output power (TTOP), wherein said trigger frame includes data corresponding to
        a reported tester transmit power (RTTP) of said tester data packet signal, wherein said RTTP and said TTOP are unequal, and
        a desired received signal strength (TRSS) of a DUT data packet signal to be received by said tester from said DUT;
    receiving, with said tester from said DUT, a DUT data packet signal having a DUT transmit output power of RTTP−DRSS+TRSS, wherein DRSS is a received signal strength of said tester data packet signal reported by said DUT; and
    repeating said transmitting and said receiving for a plurality of combinations of values of said TTOP, said RTTP and said DRSS.

2. The method of claim 1, wherein said RTTP is greater than said TTOP.

3. The method of claim 1, wherein said repeating of said transmitting and said receiving comprises successively increasing said TRSS at least until said received signal strength of the DUT data packet signal received by said tester from said DUT remains constant.

4. The method of claim 1, wherein said repeating of said transmitting and said receiving comprises successively decreasing said TRSS at least until said received signal strength of said DUT data packet signal received by said tester from said DUT remains constant.

5. The method of claim 1, wherein said repeating said transmitting with said tester, said receiving with said DUT, said transmitting with said DUT, and said receiving with said tester comprises successively decreasing said TRSS at least until said received signal strength of said DUT data packet signal received by said tester remains constant.

6. A method of testing transmission and reception performance of a data packet signal transceiver device under test (DUT), comprising:
    receiving, with a DUT, a tester data packet signal including a trigger frame and having a tester transmit output power (TTOP), wherein said trigger frame includes data corresponding to
        a reported tester transmit power (RTTP) of said tester data packet signal, wherein said RTTP and said TTOP are unequal, and
        a desired received signal strength (TRSS) of a DUT data packet signal to be received by a tester from said DUT;
    transmitting, with said DUT for said tester, a DUT data packet signal having a DUT transmit output power of RTTP−DRSS+TRSS, wherein DRSS is a received signal strength of said tester data packet signal reported by said DUT; and
    repeating said receiving and said transmitting for a plurality of combinations of values of said TTOP, said RTTP and said DRSS.

7. The method of claim 6, wherein said RTTP is greater than said TTOP.

8. The method of claim 6, wherein said repeating of said receiving and said transmitting comprises successively increasing said TRSS at least until said received signal strength of the DUT data packet signal remains constant.

9. The method of claim 6, wherein said repeating of said receiving and said transmitting comprises successively decreasing said TRSS at least until said received signal strength of said DUT data packet signal remains constant.

10. A method of testing transmission and reception performance of a data packet signal transceiver device under test (DUT), comprising:
transmitting, with a tester, a tester data packet signal including a trigger frame and having a tester transmit output power (TTOP), wherein said trigger frame includes data corresponding to
a reported tester transmit power (RTTP) of said tester data packet signal, wherein said RTTP and said TTOP are unequal, and
a desired received signal strength (TRSS) of a DUT data packet signal to be received by said tester from a DUT;
receiving, with said DUT, said tester data packet signal and in response thereto reporting a received signal strength (DRSS) of said tester data packet signal received by said DUT;
transmitting, with said DUT, a DUT data packet signal having a DUT transmit output power of RTTP−DRSS+TRSS;
receiving, with said tester, said DUT data packet signal; and
repeating said transmitting with said tester, said receiving with said DUT, said transmitting with said DUT, and said receiving with said tester for a plurality of combinations of values of said TTOP, said RTTP and said DRSS.

11. The method of claim 10, wherein said RTTP is greater than said TTOP.

12. The method of claim 10, wherein said repeating said transmitting with said tester, said receiving with said DUT, said transmitting with said DUT, and said receiving with said tester comprises successively increasing said TRSS at least until said received signal strength of the DUT data packet signal received by said tester remains constant.

* * * * *